United States Patent [19]

Hirosawa et al.

[11] Patent Number: 4,550,386
[45] Date of Patent: Oct. 29, 1985

[54] TERMINAL CONTROLLER

[75] Inventors: Toshio Hirosawa, Machida; Masaru Ohki, Kodaira; Katuto Miyazaki, Hachioji; Nobuo Kobayashi; Naoko Koizumi, both of Kokubunji, all of Japan

[73] Assignee: Hitachi, Ltd., Tokyo, Japan

[21] Appl. No.: 563,614

[22] Filed: Dec. 20, 1983

[30] Foreign Application Priority Data

Dec. 22, 1982 [JP] Japan ............................. 57-223818

[51] Int. Cl.[4] .............................................. G06F 3/14
[52] U.S. Cl. ................................... 364/900; 340/721
[58] Field of Search ... 364/200 MS File, 900 MS File; 340/717, 723, 724, 721, 734

[56] References Cited

U.S. PATENT DOCUMENTS 4,070,710 1/1978 Sukonick et al. .................... 364/900
4,278,973 7/1981 Hughes ................................ 340/721

Primary Examiner—Raulfe B. Zache
Attorney, Agent, or Firm—Antonelli, Terry & Wands

[57] ABSTRACT

A terminal controller for allowing concurrent operations of a plurality of application programs, each said application program using an input/output data stream including an address information for enabling to display data on the overall screen of a terminal enables the outputs from application programs which operate concurrently to be displayed on the split screen of a single terminal linked with said terminal controller. An address conversion is carried out in the terminal controller on at least a portion of the address information in an input data stream input from a terminal and on at least a portion of the address information in an output data stream output from an application program.

8 Claims, 12 Drawing Figures

FIG. 5

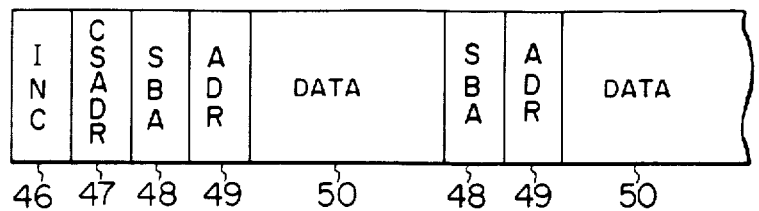

| INC | CSADR | SBA | ADR | DATA | SBA | ADR | DATA |
|-----|-------|-----|-----|------|-----|-----|------|
| 46  | 47    | 48  | 49  | 50   | 48  | 49  | 50   |

FIG. 6

| ITEM NUMBER | INC | MEANING | ITEM NUMBER | INC | MEANING |
|---|---|---|---|---|---|
| 1 | X'60' | NO INC CREATION | 16 | X'7A' | FUNCTION KEY 10 |
| 2 | X'6C' | PROGRAM ACCESS KEY 1 | 17 | X'7B' | FUNCTION KEY 11 |
| 3 | X'6E' | PROGRAM ACCESS KEY 2 | 18 | X'7C' | FUNCTION KEY 12 |
| 4 | X'6B' | PROGRAM ACCESS KEY 3 | 19 | X'7D' | TRANSMIT KEY |
| 5 | X'6D' | CLEAN KEY AND SCREEN KEY | 20 | X'7E' | TRANSMISSION MARK DETECTION BY LIGHT PEN |
| 6 | X'7F' | INTERRUPT KEY (WITHOUT SCREEN SPLIT FUNCTION) | 21 | X'80' | SPLIT FUNCTION |
| 7 | X'F1' | FUNCTION KEY 1 | 22 | X'81' | SPLIT TERMINATION |
| 8 | X'F2' | FUNCTION KEY 2 | 23 | X'8F' |  |
| 9 | X'F3' | FUNCTION KEY 3 | 24 | X'9F' |  |
| 10 | X'F4' | FUNCTION KEY 4 | | | |
| 11 | X'F5' | FUNCTION KEY 5 | | | |
| 12 | X'F6' | FUNCTION KEY 6 | | | |
| 13 | X'F7' | FUNCTION KEY 7 | | | |
| 14 | X'F8' | FUNCTION KEY 8 | | | |
| 15 | X'F9' | FUNCTION KEY 9 | | | |

TERMINAL CONTROLLER

BACKGROUND OF THE INVENTION

The present invention relates to a terminal controller and particularly to a terminal controller in which a control system is incorporated to enable to use a video data terminal from a plurarity of programs by spliting the video screen of the video data terminal.

In recent years, it has been a common practice to utilize a network configuration in which a plurality of computer systems are linked with each other. For example, there is known a laboratory automation (LA) control system comprising hierachically linked host machines (large-scale computers) and local machines (small-scale computers).

The system network configuration aims at:
(1) effective communication resource utilization,
(2) distribution of communication system functions,
(3) flexible expansion of communication network, and
(4) labor saving in application systems.

The virtual telecommunication access method (VTAM) has been known as a method for accessing other machines through communication lines and provides the following advantages: (1) a plurality of terminals can share a communication line, (2) application programs in any host machine can be used at any location in the communication network, and (3) the application programs need not perceive the network configuration. For system network configurations and VTAM, refer to the IBM System Journal, Vol. 15, No. 1, 1976; an article entitled "Synchronous data link control: A perspective", IBM Systems Journal, Vol. 13, No. 2, 1974 and "VOS3 ECS/VTAM Guide" (manual of Hitachi Ltd.) 8080-3-140, 1980.

FIG. 1 illustrates an example of the system network configuration. The host machines 1 and 2 are linked with each other via a communication line through the communication control computers 3 and 4. The communication control computers 3 and 4 can be connected in parallel to a plurality of other machines in the network. A local machine (subhost machine) 5 is linked with the communication control computer 3 of the host machine 1 or with other local machines through a controller 6 which enables data communication between these devices. The controller 6 is provided to control communication procedures such as the high-level data link control (HDLC) procedure and the synchronous data link control (SDLC) procedure.

In the system network configuration, application programs in the host machine 1 can be used from a terminal 7 of the host machine 1 and also from a terminal 8 of the host machine 2. Assuming that a time sharing system (TSS) is used as the application program, a user program (TSS-AP) 9 runs under control of a TSS control program 10 and the TSS control program 10 utilizes a VTAM program 11 in the host machine 1.

To output a message from the user program 9 to the terminal 7 or 8, the HDLC procedures are processed by a network control program 13 in the communication control computer 3 through processing of the VTAM 11 and a host operating system 12; and the message is output to the terminal 7 or it is delivered to the communication control computer 4 to be transmitted to the terminal 8. On the contrary, the above-mentioned processing need only be reversed to input a message from the terminal 7 or 8.

Furthermore, application programs of the host machines 1 and 2 can be accessed from a terminal connected to the local machine 5. The local machine 5 is called a local machine or terminal controller having a cluster control function.

In the local machine 5, a Hitachi network architecture subhost communication program (HICOP) 18 runs under control of an operating system 17, further a data stream compatibility (DSC) program 19 operates under the HICOP 18. The HICOP 18 is provided to carry out VTAM functions, whereas the DSC program 19 is used to enable a terminal 16 connected to the local machine 5 to be treated in the same way as for the terminal 7 connected to the host machine 1 when an input/output message is output to the terminal 16 from the application program 9 in the host machine 1. This means that the functions of terminal controllers are carried out by the local machine 5 and the control programs 17-19. For the data streams between the host machine 1 and the local machine 5 and processing procedures of the HICOP 18 and the DSC program 19, refer to the co-pending U.S. patent application Ser. No. 515,193 filed on July 19, 1983, which corresponds to the Japanese Patent Application No. Sho 57-126341.

As explained above, the system network depicted in FIG. 1 provides the following advantages by use of the VTAM and the cluster control function of the local machine 5: (1) terminals connected to local machines can be utilized as host machine terminals and (2) host machine capability and resources can be used from local machine terminals.

Reference numeral 20 in FIG. 1 indicates a laboratory of a laboratory automation (LA) system including hierarchically connected host machine 1 and local machine 5. The local terminal 16 and a measuring instrument standard interface bus 21 are equipped in the laboratory 20. An application program 23 (to be denoted as LAAP 1) and the like are used to control measuring instruments and apparatuses 22 and to gather measured data in the local machine 5, then the collected data is stored in a local file 24.

In general, the host machine 1 is utilized to perform more precise analyses on the collected data. The U.S. patent application Ser. No. 515,193 has disclosed a control system which allows to use the terminal 16 connected to a local machine as a control terminal for the application program 9 of the host machine 1 and enables the host machine 1 to directly access the local file 24, including effects of the control system.

When only the video terminal 16 is connected to the local machine 5, the operator uses the terminal 16 as a control terminal for the application program 23 to gather measured data, then the terminal 16 is used as a control terminal for the application program 9 of the host machine 1 (, which is called an expansion to a host TSS). That is, the terminal 16 is logically separated from the application program 23 after the local program 23 of the local machine 5 is finished and the terminal operates as a terminal of the host TSS. This means that the terminal 16 is logically connected to the HICOP 18 and DSC 19. Consequently, collection of the measured data by use of the application program and analysis by means of the application program 9 in the host machine 1 cannot be concurrently carried out from a terminal.

Although the measurement and analysis can be naturally conducted by using a terminal for controlling collection of measured data and a terminal for analyzing data by a host machine, the number of expensive terminals is increased and the space for the LA system in the laboratory is reduced. Moreover, the operation becomes complex because only one operator must handle two terminals.

Furthermore, if it is necessary to execute a plurality of application programs from a video terminal, that is, if the outputs from several application programs are to be split and displayed on the screen of a video terminal, all programs that run simultaneously must be regenerated so that the video terminal can be commonly used among them for the following reasons:

(1) The common use of a video terminal must be perceived when each application program manages the buffer for storing the output data stream, and (2) Each application program must be provided with a processing for determining the destination application program to which a data item input from the video terminal is to be input.

These modifications for existing application programs will necessitate a tremendous time and cost.

SUMMARY OF THE INVENTION

An object of the present invention is to provide a terminal controller which enables to simultaneously execute at least two programs from a terminal without causing any modifications on the existing application programs.

Another object of the present invention is to provide a terminal controller which enables arbitrarily change between the screen split operation mode for allowing a split screen display of a plurality of application programs on a screen of a video terminal and the ordinary screen operation mode for allowing a single screen display of an application program on a screen of a video terminal by inputting a special control code from the video terminal to the terminal controller.

A terminal controller according to the present invention in a configuration comprising video data terminals and a controller (including a minicomputer or microcomputer) for controlling the video data terminal operates as follows. When a video screen split command is issued from the terminal, a special program in the terminal controller is initiated to set the operation modes of the pertinent processing programs to allow at least two programs can share the screen of the video data terminal. After the screen split operation mode is set, the processing to merge screen display data and the processing to distribute input data to an application program that shares the relevant terminal are performed so that each application program that runs independently can perform input/output processing for a video terminal as if the terminal is dedicated only to the application program.

BRIEF DESCRIPTION OF THE DRAWINGS

The above and other objects and advantages of the present invention will become apparent in the following description and the accompanying drawings in which:

FIG. 5 is a diagram showing a diagram showing the format of an input data stream from a video data terminal;

FIG. 6 depicts a table listing examples of INC (INterrupt Code) codes in input data streams and their meanings;

DESCRIPTION OF THE PREFERRED EMBODIMENT

Figure 1:
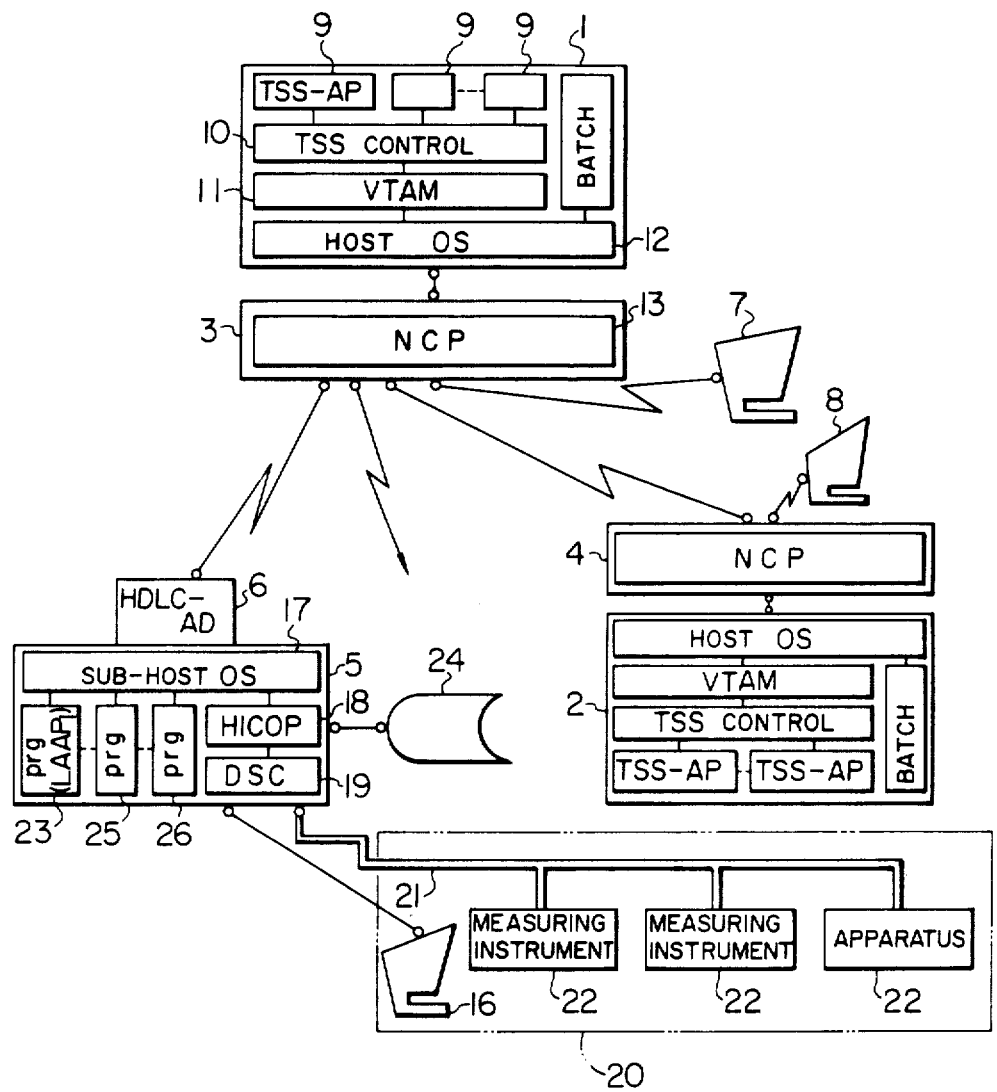
FIG. 1 is a diagram illustrating an example of the system network configuration.
Figure 2:
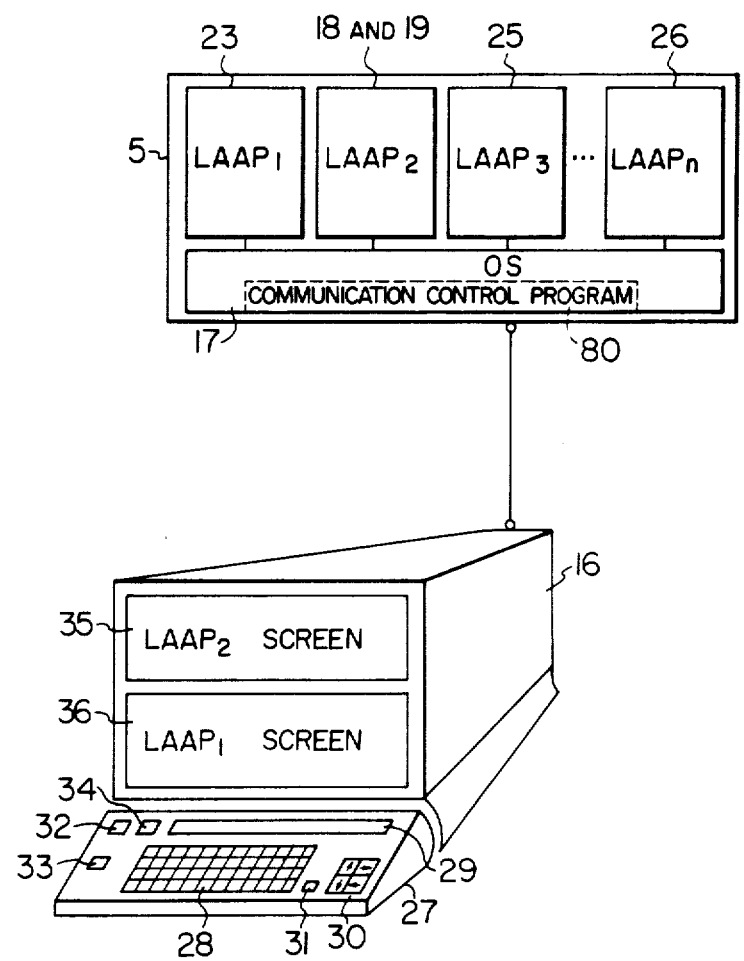
FIG. 2 is a diagram showing the video data terminal configuration and the program configuration of a local machine when the screen of the video data terminal is commonly used.

FIGS. 1 and 2 are diagrams illustrating the system network configuration and the configuration comprising a local machine having the terminal control function and a video data terminal, respectively to which the present invention is applied.

The local machine 5 in FIG. 1 has the terminal control function according to the present invention. More concretely, the function is included in the subhost OS 17. FIG. 2 shows the connection between the local machine 5 and the video data terminal 16 illustrated in FIG. 1. The executable application programs in the local machine 5 and designated as LAAP 1, LAAP 2, LAAP 3, ..., and LAAP n; which correspond to application programs 18-26 shown in FIG. 1, respectively. For example, the HICOP 18 and DSC program 19 correspond to LAAP 2, whereas the application program 23 corresponds to LAAP 1. This means that the TSS-AP 9 of the host machine 1 can be regarded as equivalent to the application programs 23-26 of the local machine 5 by using the HICOP 18 and DSC program 19. The terminal control function according to the present invention is incorporated in a communication program 80 of the operating system (to be abbreviated as OS hereinafter) of the local machine 5. Referring to FIG. 2, it is found that the video data terminal 16 comprises a display section and a keyboard unit 27. The keyboard unit 27 is equipped with a split command key 32, a cursor select key 33 for selecting one of two cursors (that is, an upper cursor or a lower cursor), and a screen split operation terminate key 34 according to the present invention in addition to an alphanumeric and katakana (the Japanese syllabary) key section 28, a function key section 29, a cursor shift key section 30, and a transmit key 31.

The split screen display operation of the video screen is initiated when the split command key 32 is pressed on the keyboard unit 27. For example, the HICOP 18 and DSC 19 which run in the LAAP 2 of the local machine 5 can use the upper screen 35 area in the video terminal screen, whereas the measurement data gathering application program 23 which operates in the LAAP 2 can use the lower screen 36 area. Although the video data terminal screen is shared between the TSS communication program HICOP 18 and DSC 19 which are regarded as application programs and the application program 23 in this embodiment, it is natural that the display screen of the video data terminal 16 can be split and commonly used by the application program 23 and another application program, for example, application program 25 in the local machine 5.

Figure 3:
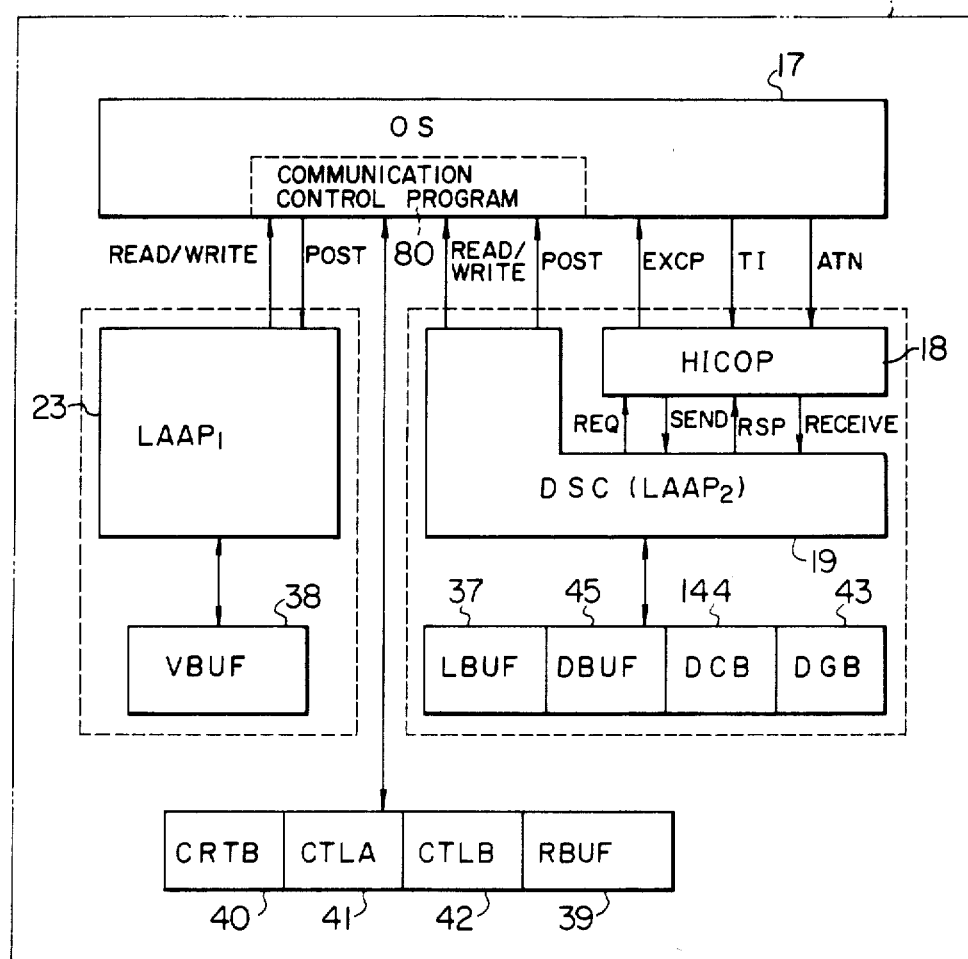
FIG. 3 depicts a diagram showing relationships between control programs in the memory of the local machine according to the present invention.

FIG. 3 is a diagram illustrating relationships between control programs and control tables in the memory of the local machine. In addition to programs such as the OS 17, HICOP 18, DSC 19, application program 23, and the communication control program 80, the main memory of the local machine 5 contains a memory area or a buffer LBUF 37 in which the DSC 19 stores the input/output data of video data terminals in the input/output data stream format, a memory area or a buffer VBUF 38 in which the application program 23 stores the input/output data of video data terminals in the input/output data stream format, a memory area or buffer RBUF 39 for storing the output data streams to be used to generate actual screen images on the video data terminal screen, and various control tables. There are provided a control table CRTB 40 for storing the display operation status of the video data terminal 16, and control tables CTLA 41 and CTLB 42 for respectively storing the screen display information when the pertinent video screen is split and shared. Control tables DGB 43, DCB 144, and a data buffer DBUF 45 are used to manage the input/output data of terminals between the HICOP 18 and the DSC program 19.

Since the present invention relates to the communication control program 80, and more specifically relates to control tables CRTB 40, CTLA 41, and CTLB 42; an input/output area RBUF 39, and buffers LBUF 37 and VBUF 38 for application programs.

According to the present invention, the communication control program 80 stores the information necessary for split screen display on the video screen in control tables CRTB 40, CTLA 41, and CTLB 42 according to the video screen split command information input from the terminal 16 by the operator. When an input/output request for a video data terminal is issued thereafter from the DSC program 19 or LAAP 1, the specified split screen display is performed according to the screen split command information. Therefore, the read and write requests are issued from the DSC program 19 (LAAP 2) and the application program 23 (LAAP 1) to the communication control program 80 as indicated by arrows in FIG. 3, and the processing termination for each request is made by use of a "POST". The read means a data input from a terminal, the write indicates a data output to a terminal, and the post designates a processing termination report from the communication control program 80. Refer to the U.S. application Ser. No. 515,193 for details about the requests and responses between the OS 17 and the HICOP 18 and between the HICOP 18 and DSC program 19 and relevant processing procedures.

Figure 4:
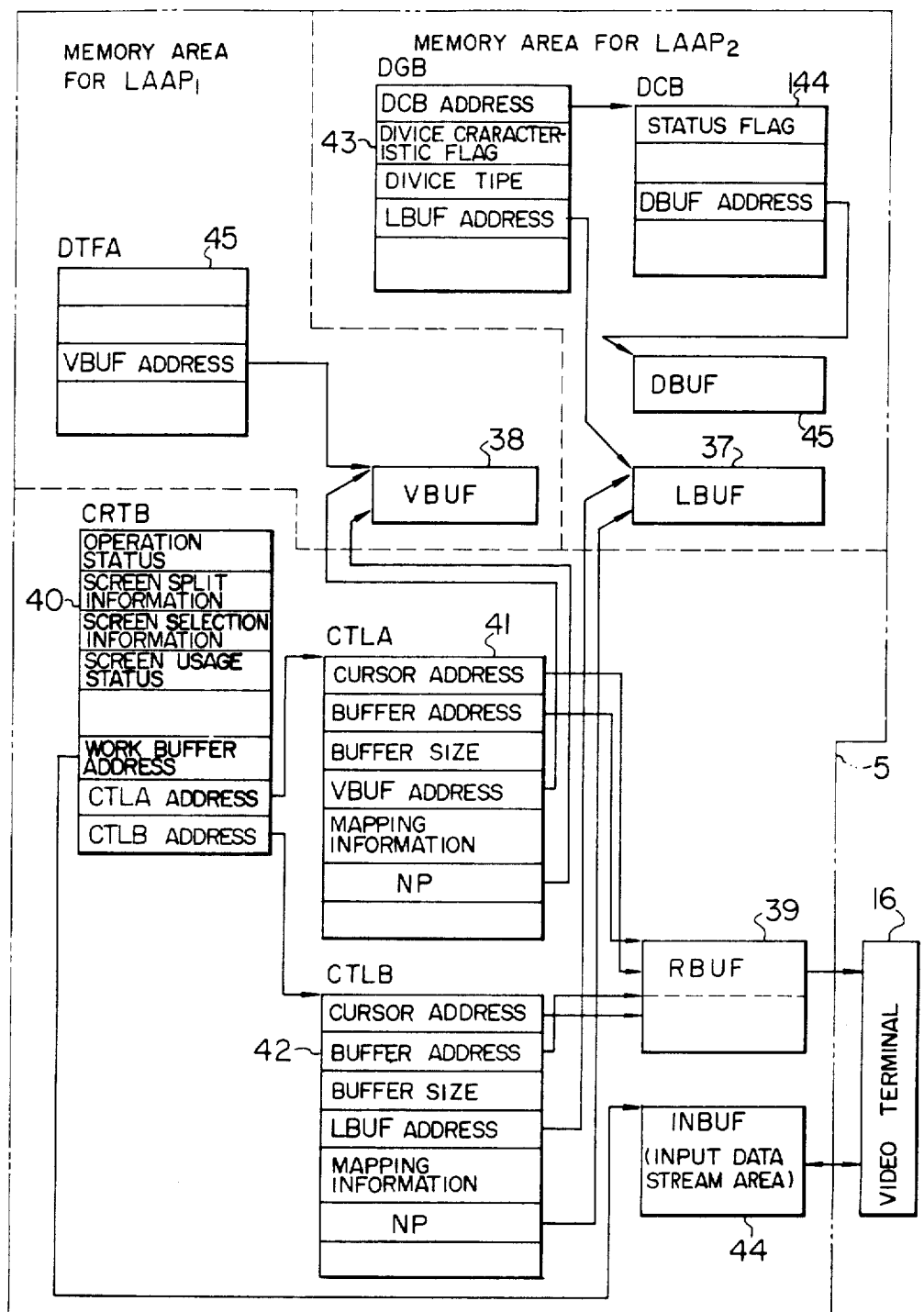
FIG. 4 illustrates a schematic diagram showing in detail control tables shown in FIG. 3.

FIG. 4 illustrates in detail control tables shown in FIG. 3. A data stream input or output request from or to the video data terminal 16 issued by the application program LAAP 1 or LAAP 2 to the communication control program 80 is processed via the input/output areas VBUF 38 and LBUF 37 for application programs, respectively. Consequently, although the LAAP 2 splits and utilizes the video screen of a video data terminal in the embodiment according to the present invention, the video screen of a video data terminal can be split and shared among other application programs, for example, LAAP 3 to LAAP n as explained hereinbefore.

(1) First the switching control of the split screen operation of the video screen will be explained.

When a terminal user requests to split the video screen of the video data terminal 16, the cursor on the screen must be moved upward or downward by means of the cursor shift key block 30 on the keyboard unit 27 shown in FIG. 2 to a position at which the screen is to be split. The cursor shift key block 30 comprises four pushbuttons. When a pushbutton is pressed, the cursor is moved on the screen to the direction indicated by an arrow on the pushbutton. Then, the operator need only press the screen split command key 32.

In this case, a mechanism such as a light pen may be utilized in place of the cursor shift keys.

FIG. 5 illustrates the input data stream from the video data terminal 16 to the communication control program 80 in the local machine 5. The input data stream comprises:

(a) INC (interrupt code) 46 indicating the cause of data input, (b) Cursor address CSADR 47 on the video screen, (c) SBA (set buffer address) code 48 indicating that the next data is the buffer address on the screen, (d) Buffer address ADR 49 on the screen, and (e) Input data 50.

The information from the SBA 48 to the data 50 forms a group and this group may repeatedly appear in some cases.

FIG. 6 is a table listing the interrupt codes (INC) 46 shown in FIG. 5 and their meanings. When the screen split command key 32 is pressed, a hexadecimal representation X'80' indicated for the item number 21 in FIG. 6 is stored as the INC. The letter X indicates hexadecimal notation.

Figure 7:
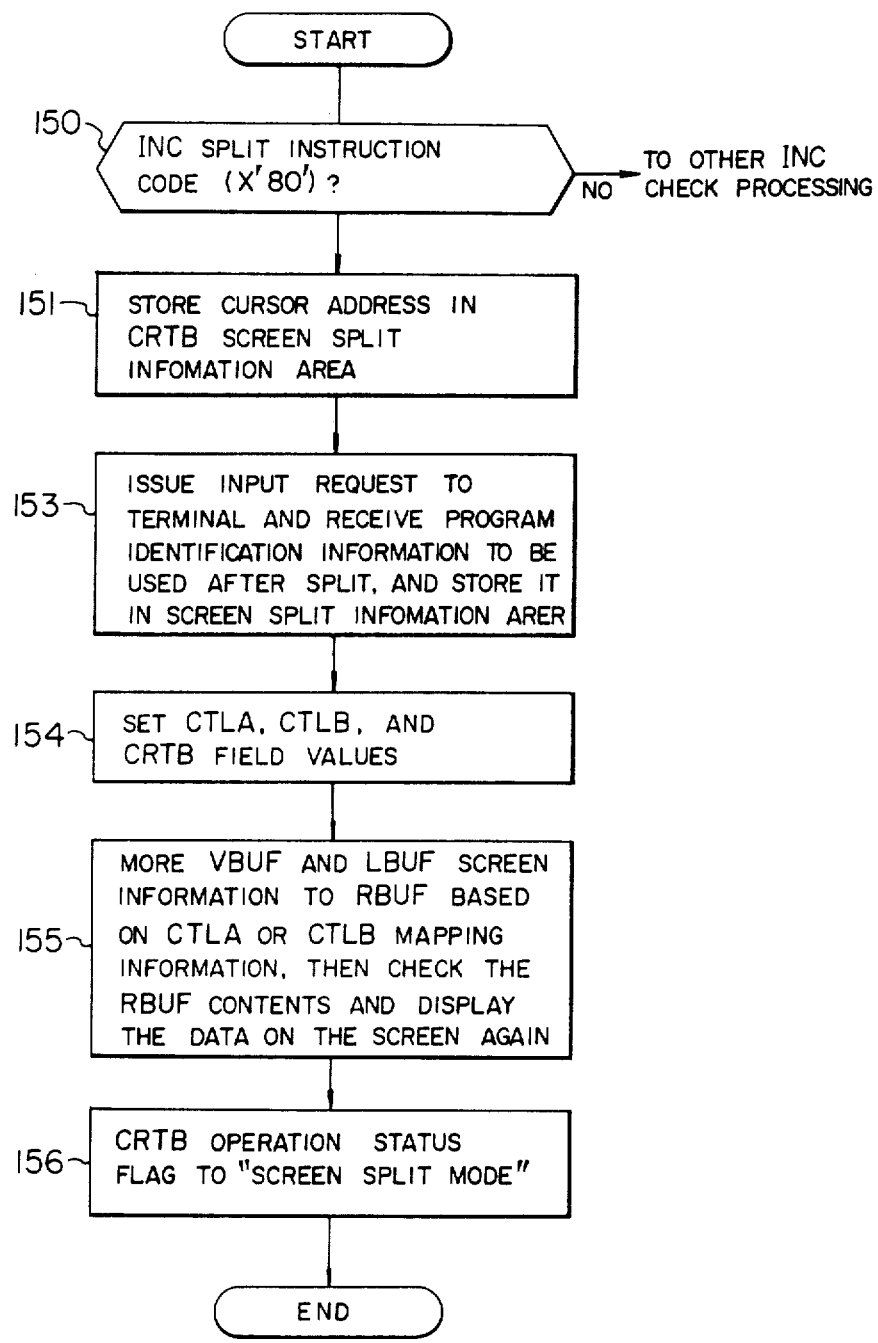
FIGS. 7 and 8 show the processing flowcharts of programs to be used when a video screen split command is issued and when a video screen split terminate command is issued, respectively according to the present invention.

FIG. 7 is the processing flowchart of the processing to be carried out by the communication control program 80 when the screen split command key 32 is depressed.

In the decision processing 150, the data shown in FIG. 5 is examined to recognize that the INC 46 contains the screen split command code (X'80'), then the cursor address CSADR 47 is stored in the screen split information area of CRTB 40 in the processing 151. The screen split information area comprises management information for splitting and sharing a video screen as follows:

(a) Identification information of the program to be used, (b) At least one group of management information comprising the range information of the screen area available on the actual screen. The screen range is indicated by use of two buffer addresses corresponding to line numbers on the video screen. If a screen comprises 24 lines and each line comprises 80 columns, up to 1920 buffer address can be used ranging from address 0 to address 1919. The relationship between the line number m and column number n and the buffer address BA is represented by expression (1) as follows:

$$BA = (m-1) \times 80 + (n-1) \qquad (1)$$

Consequently, if the cursor is placed at a position of column 1 of line 12 to split the screen;

(a) The upper-half area of the screen ranges from line 1 to column 80 of line 11, that is, the buffer address range is indicated as:

$$BA_L^U = 0$$

$$BA_H^U = 879$$

Where $BA_L^U$ is the first buffer address of the upper-half area of the video screen and $BA_H^U$ indicates the last buffer address.

(b) On the other hand, the lower-half area of screen ranges from line 13 to column 80 of line 24, that is, the buffer address range is indicated as:

$$BA_L^L = 960$$

$$BA_H^L = 1919$$

Where, $BA_L^L$ is the first buffer address of the lower-half of the video screen and $BA_H^L$ indicates the last buffer address.

When the processing 153 is performed, the identification information of programs that share the split video screen is obtained. The identification information contains program numbers and names. In this case, the data input/output operations between the terminal controller and terminal 16 are carried out via INBUF 44. If the data to be output to the terminal 16 is transferred to RBUF 39, INBUF 44 can be dedicated to data input operations.

In the processing 154, the connecting relationships between control tables CRTB 40, CTLA 41, and CTLB 42 shown in FIG. 4 are established and a value is stored in each field of these control tables. The buffer addresses in CTLA 41 and CTLB 42 indicate the first addresses, respectively when RBUF 39 is split. The buffer size indicates the length of the pertinent buffer area, that is, the value of $$BA_H^U - BA_L^U + 1$$

is set in CTLA 41; and $$BA_H^L - BA_L^L + 1$$

is set in CTLB 42.

The mapping information is used in the data stream input/output operations to update the value of the buffer address ADR 49 (FIG. 5) following the SBA code in a data stream when the output data streams of VBUF 38 and LBUF 37 to RBUF 39 are moved to the RBUF 39; or contrary, when the data stream of the INBUF 44 is distributed to the VBUF 38 and LBUF 37. If CTLA 41 is assumed to be a control table for the upper-half area of the split video screen, the $BA_L^U$ and $BA_H^U$ explained before are stored in CTLA 41; whereas $BA_L^L$ and $BA_H^L$ are stored in CTLA 42.

In the processing 155, the video screen information stored in the VBUF 38 and LBUF 37 is sequentially moved to RBUF 39 and is displayed again. If only the CTLA 41 is utilized in this case, no image is displayed on the lower-half area of the video screen.

In the processing 156, the screen split mode flag of the operation status information in the CRTB 40 is set to be "1" so tht all input/output operations for the video data terminal thereafter are performed in the screen split operation mode.

(2) Next, the release operation of the screen split operation mode will be described.

The release operation of the screen split operation mode is activated when the screen split terminate key 34 shown in FIG. 2 is depressed by a terminal user. When the screen split terminate key 34 is depressed, the INC 46 shown in FIG. 5 is set to the split terminate code X'81' listed for the item number 22 depicted in FIG. 6. When the communication control program 80 recognizes this control code, the screen split operation mode which has been set so far is released and the single screen display operation is restored. The screen split operation mode release operation is completed by setting the screen split mode flag of the operation status information in the CRTB 40 to "0".

Figure 8:
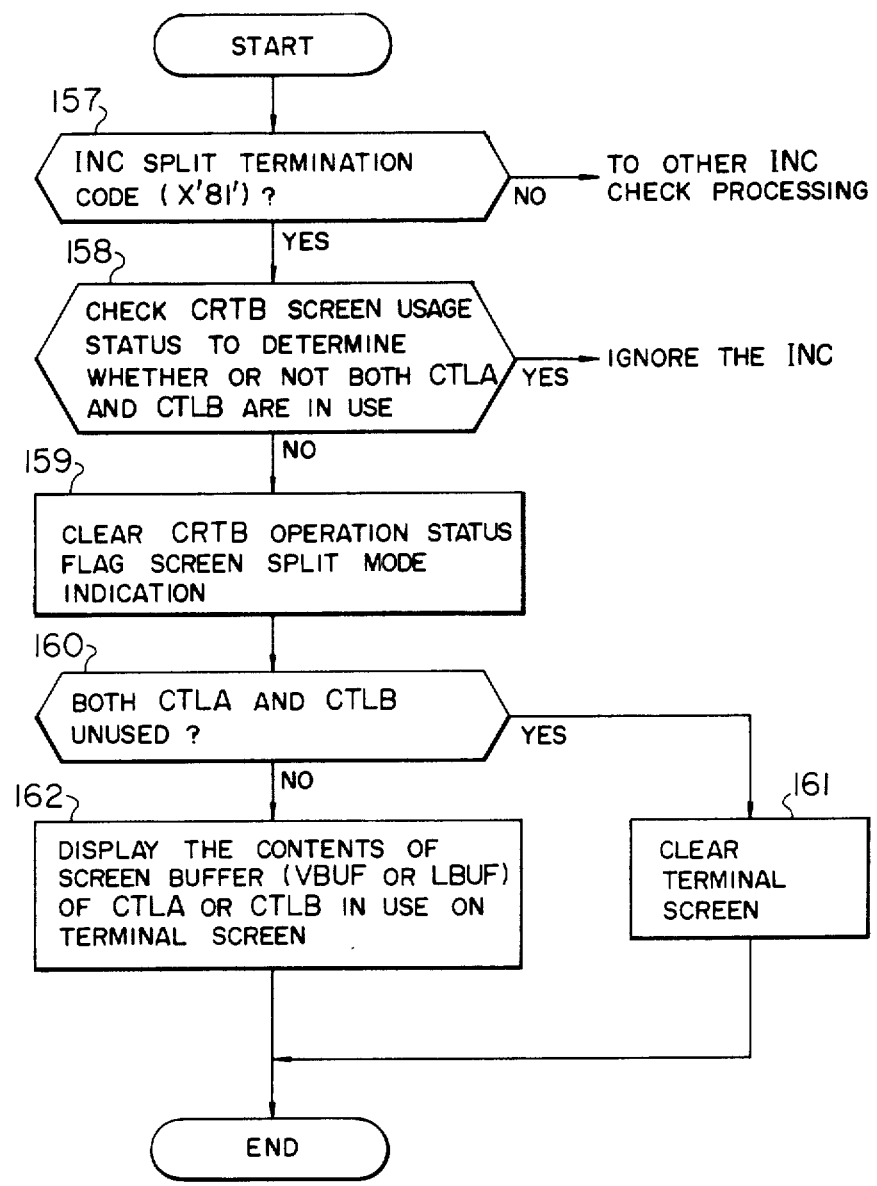

FIG. 8 shows the processing flowchart of the processing to be carried out by the communication control program 80 when the screen split terminate key 34 is pressed. In the decision processing 157, the data stream illustrated in FIG. 5 is examined to recognize that the INC 46 contains the screen split terminate command.

Next, the processing 158 checks whether or not the screen split mode flag of the operation status information in the CRTB 40 is "1". If it is "0", the video screen is not operating in the screen split mode, thus the value in the INC 46 is ignored. If it is "1", the screen usage status information in the CRTB 40 is checked. The screen usage status information indicates whether or not the video screen of the terminal 16 is being used by the application program 23 or the like. It is set to "1" when an application program issued an open request to use the communication control program 80 and is set to "0" when a close request thereof is issued. Therefore, this information is used in the CRTB 40 to indicate whether or not the CTLA 41 and CTLB 42 are being used. If both of them are being used, the value of the INC 46 is ignored even if the screen split terminate kay 34 is depressed. In this case, one of the application program using the terminal 16 must be terminated before the screen split terminal key 34 is depressed again.

If at least one of the CTLA 41 and CTLB 42 is not being used, the screen split operation mode flag in CRTB 40 is set to "0" in the processing 159 to release the screen split operation mode.

Next, the processing 161 or 162 is executed depending on the result of the decision processing 160. If both CTLA 41 and CTLB 42 are not being used, the screen image of the video data terminal 16 is cleared in the processing 161. If at least one of the CTLA 41 and CTLB 42 is not being used, the contents of the buffer being used, that is, LBUF 37 or VBUF 38 in this embodiment are displayed on the video screen of the video data terminal 16, thereby resuming the service in use on the video data terminal 16 and releasing the screen split operation mode.

(3) Next, the operation for transmitting data to a video data terminal will be described.

To transmit data to the video data terminal 16, a WRITE macro request is issued to the communication control program 80 after notifying the addresses of the areas, that is, the VBUF 38 and LBUF 47 in which an application program 23 (LAAP 1) and the DSC 19 (LAAP 2) which run in the local machine 5 store output data streams for transmission to the communication control program 80 as illustrated in FIG. 3.

The application program transfers an output data stream whose size is equivalent to that of the screen of the video data terminal 16 to the VBUF 38 and LBUF 37. The communication control program 80 forms and transmits the output data stream whose size is equivalent to that of the screen of the video data terminal 16 to the video data terminal by use of such control tables and the like shown in FIG. 4 as the CRTB 40, CTLA 41, CTLB 42, LBUF 37, VBUF 38, and RBUF 39.

After issuing an open request to use the communication control program 80, the application program performs a data input/output operation for the video data terminal 16. On receiving an open request from the application program, the communication control program 80 examines the screen split operation mode flag of the operation status information in the CRTB 40. If it is "1", the bit indicating the identification information of the program to be used is set to "1" in the CRTB 40, thereby allowing the use of the CTLA 41 or CTLB 42. After this point, the communication control program 80 can be used until the application program issues a close request to terminate the use of the communication control program 80.

On receiving a data transmission request from an application program, the communication control program 80 sequentially fetches the output data stream from the specified data buffer (VBUF 38 or LBUF 37) and converts the screen address information included in the data stream string to the address information on the actual split screen of the video data terminal 16 by using the mapping information stored in the CTLA 41 and CTLB 42 depicted in FIG. 4, then store the resultant data in the actual screen buffer RBUF 39. The data streams from application programs are stored in the respective areas of the RBUF 39 corresponding to the ranges of the split video screen. The split areas of the RBUF 39 are managed according to the control trables CRTB 40, CTLA 41, and CTLB 42 illustrated in FIG. 4.

Figure 9:
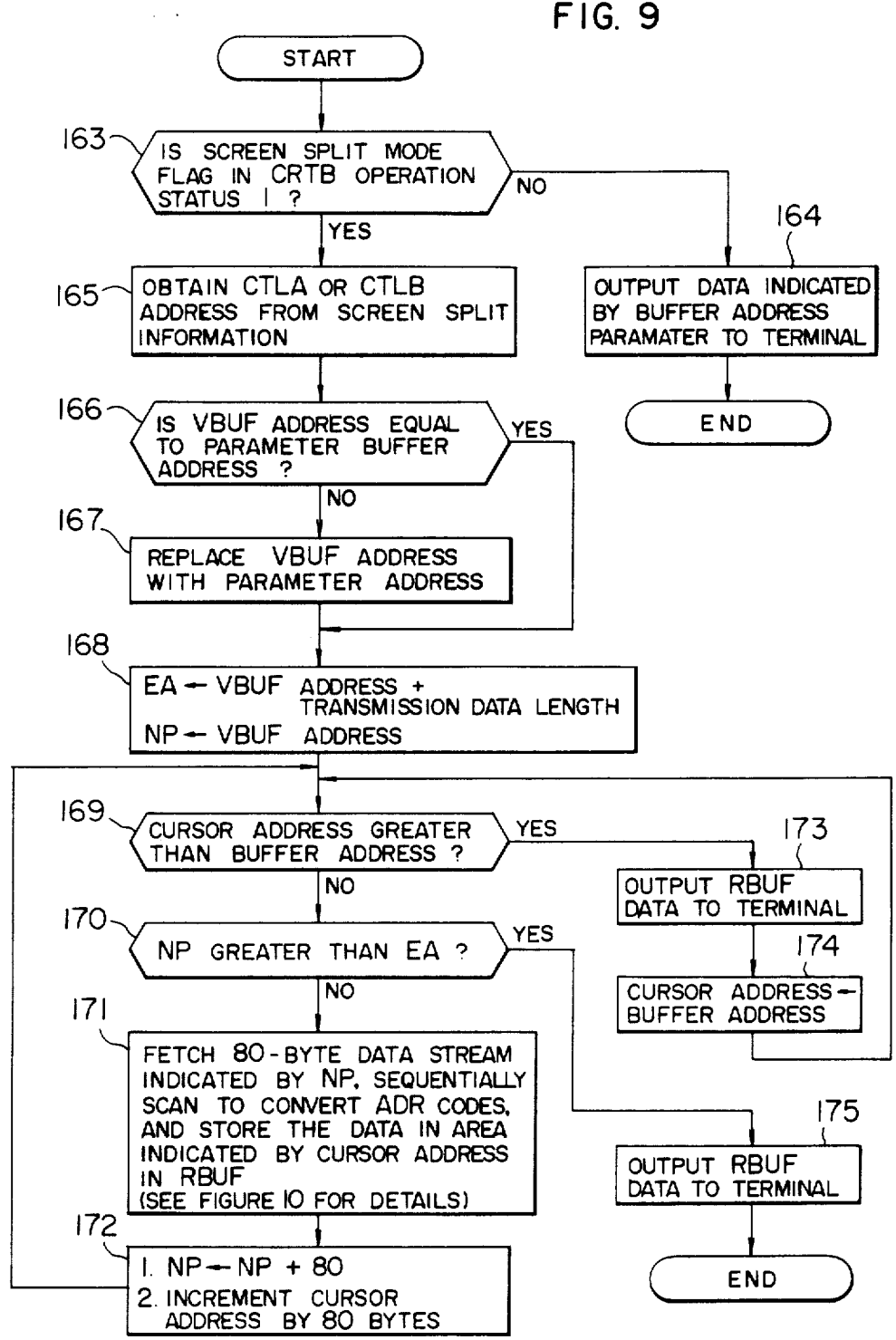
FIG. 9 illustrates the processing flowchart of a program to be used to output data to a video data terminal according to the present invention.

FIG. 9 is the processing flowchart of the processing to be carried out by the communication control program 80 for transmitting data from an application program. According to FIG. 9, the processing 164 is executed if the result of the decision processing 163 indicates that the operation mode is not the screen split operation mode. In the processing 164, the contents of the data buffer specified by the application program are output to the video data terminal 16 without changing the address information.

If it is recognized that the operation mode is the screen split operation mode, the processing 165 to the processing 168 are executed to prepare the address conversion for moving the contents of the data buffer specified by the application program to the RBUF 39. In the example of FIG. 9, the CTLA 41 is used in the processing 165. If the CTLB 42 is to be used, it needs only to replace the VBUF 38 with the LBUF 37 in the pertinent processing.

In the decision processing 169 to the processing 172, the contents of the data buffer specified by the application program as explained above are sequentially checked and the screen information for the split screen is converted, then the resultant data is stored in the RBUF 39. When all the aplit areas of the split screen allocated to the application program are completely used in the RBUF by the decision processing 169, all the contents of the RBUF 39 are output to the video data terminal 16 in the processing 173. On the video screen of the video data terminal 16, thus the transmission data from the application program is displayed in the upper-half or lower-half of the video screen. This means that the transmission data from any application program which shares the video data terminal can be merged and displayed on the video screen.

In this embodiment, although the addresses of the output data streams stored in the VBUF 38 and the LBUF 37 by the respective application programs are converted, stored in the RBUF 39, and are output to the video data terminal 16; the RBUF 39 may not be necessary if the data is transmitted to the video data terminal 16 immediately after the communication control program 80 performs the address conversion for the output data streams of the VBUF 38 and LBUF 37.

Figure 10:
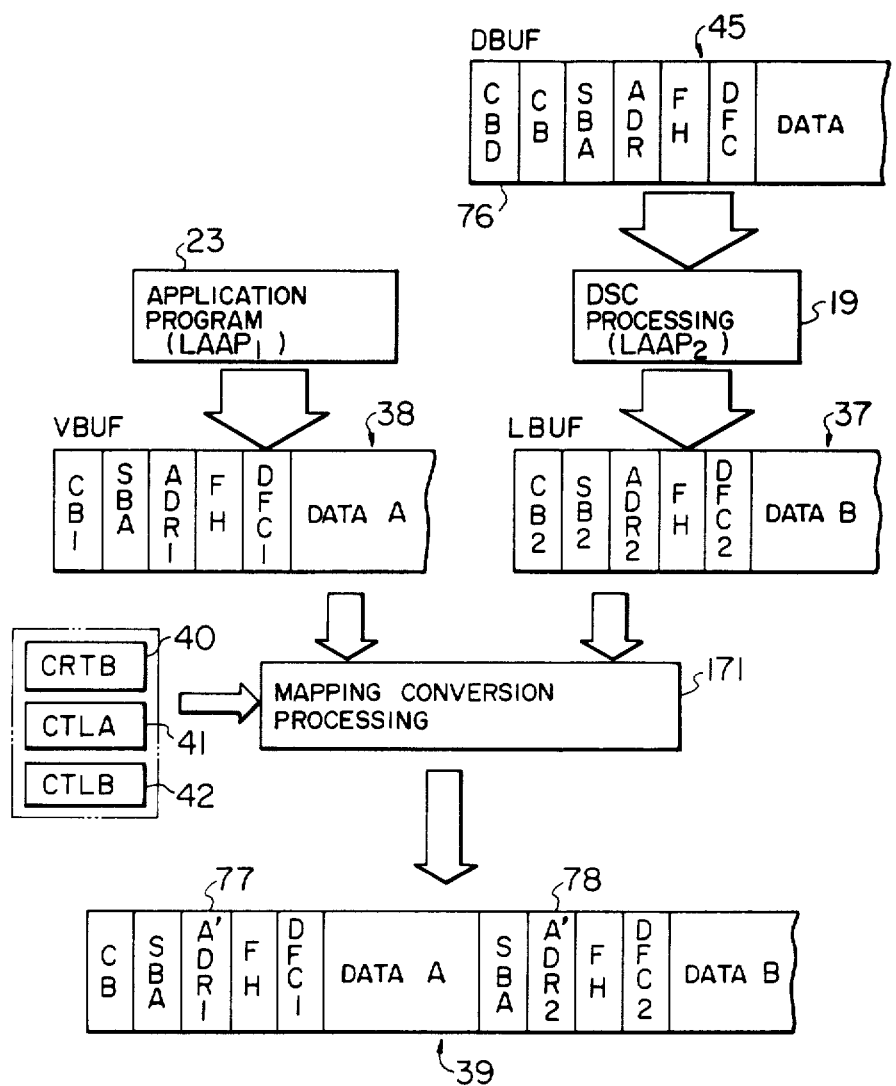
FIG. 10 shows a diagram illustrating the processing for scanning an output data stream and for converting control codes according to the present invention.

FIG. 10 is a diagram illustrating the concept of the processing for converting the screen address information shown in the processing 171 of FIG. 9. This processing is called a mapping conversion processing. Referring to FIG. 10, the output data stream in the data buffer DBUF 45 to be passed from the HICOP 18 to the DSC program 19 contains the display data string following such screen control information as the command code (CMD), control byte (CB), set buffer address (SBA) code, buffer address (ADR), field heading (FH), and define field character (DFC).

The DSC program 19 inputs the data stream of the DBUF 45. If the CMD 76 indicates a data transmission, the output data stream from which the CMD 76 is removed is stored in the application program data buffer LBUF 37, then a data transmission request is issued to the communication control program 80. The data items such as the control characters in the data stream of the LBUF 37 are suffixed, for example, as $CB_2$, $ADR_2$, and $DFC_2$ only for the purpose of explanation. They are identical to the CB, ADR, and DFC, respectively in the DBUF 45.

On the other hand, the application program 23 (LAAP 1) stores the output data stream in the application program data buffer VBUF 38 and issues a data transmission request to the communication control program 80.

In the mapping conversion processing 171 of the communication control program 80, when an SBA code is detected while scanning sequentially the output data streams in the VBUF 38 and LBUF 37 by use of the control tables CRTB 40, CTLA 41, and CTLB 42, the next data string is assumed to be the buffer address on the video screen and the screen address information ($ADR_1$ and $ADR_2$) is converted into the $ADR_1'$ 77 and $ADR_2'$ 78 based on the mapping information in CTLA 41 and CTLB 42, then the resultant data is stored in the RBUF 39.

The screen address conversion for obtaining $ADR_1'$ and $ACR_2'$ is carried out as follows. In this case, it is assumed that the CTLA 41 is used for VBUF 38 and that the mapping information in the CTLA 41 comprises the $BA_H^U$ and $BA_L^U$. Further, the CTLB 42 is used for the LBUF 37, and the mapping information in the CTLB 42 comprises the $BA_H^L$ and $BA_L^L$.

(a) Conversion by use of CTLA 41

The upper-half of the video screen is used in this case, thus the $BA_H^U$ is the basic value for the buffer address conversion. That is, if the $ADR_1$ of the VBUF 38 is less than the lower-limit address $BA_H^U$ of the upper-half of the video screen, the address conversion is not necessary and the value of the $ADR_1$ is stored in the $DR_1'$ 77.

If the $ADR_1$ is equal to or greater than $BA_H{}^U$, the data related to the $ADR_1$ is displayed in the lower-half of the video screen of the video data terminal 16. Therefore, the $ADR_1'$ 77 is converted to be equal to the value of $$ADR_1 - BA_H{}^U$$

so that the output data stream from the VBUF 38 originally prepared to be displayed on the overall screen is changed to be displayed only in the upper-half of the screen.

(b) Conversion by use of CTLB 42

The lower-half of the video screen is used in this case, thus the $BA_L{}^L$ is the basic value for the buffer address conversion. If the $ADR_2$ of the LBUF 37 is equal to or less than the $BA_L{}^L$, the data related to $ADR_2$ is displayed in the upper-half of the video screen of the video data terminal 16. Therefore, the $ADR_2'$ 78 is converted to be equal to $$ADR_2 + BA_L{}^L$$

and stored in the RBUF 39. If the $ADR_2$ is greater than the $BA_L{}^L$, the $ADR_2$ is used as the $ADR_2'$ 78 and is stored in the RBUF 39.

As explained above, the data streams in the VBUF 38 and LBUF 37 are merged (composed) in the RBUF 39 and are output to the video data terminal 16.

Although the data is transferred from the LBUF 37 or VBUF 38 to the RBUF 39 in reply to a data transmission request issued from an application program to the communication control program 80 in the embodiment of the present invention, the data transfer from the LBUF 37 or VBUF 38 to the RBUF may be further carried out in reply to a special control code input from the video data terminal 16. If this function is provided additionally, the operation can conveniently input the special control code to set the screen split operation mode. In this case, the data streams stored in the LBUF 37 and VBUF 38 are displayed on the screen of the video data terminal 16 in the screen split operation mode.

(4) Next, the operation to be executed by an application program to receive data from a video data terminal 16 will be explained.

To receive data from the video data terminal 16, an application program issues a READ macro request to the communication control program 80. The terminal user inputs data thereafter from the keyboard unit 27 depicted in FIG. 2 and presses the transmit key 31. Then, the input data stream shown in FIG. 5 is written in the INBUF 44 illustrated in FIG. 4.

The communication control program 80 examines the CSADR 47 of the input data stream in the INBUF 44. The application program related to the input data can be identified depending on whether or not the value of the CSADR 47 is less than the $BA_H{}^U$ stored in the screen split information of the CRTB 40. This means that it is determined whether the control table CTLA 41 or CTLB 42 is used.

In the next step, the ADR information in the input data stream is converted if necessary by use of the mapping information in above-mentioned control tables, then the input data stream is stored in the LBUF 37 or VBUF 38.

Figure 11:
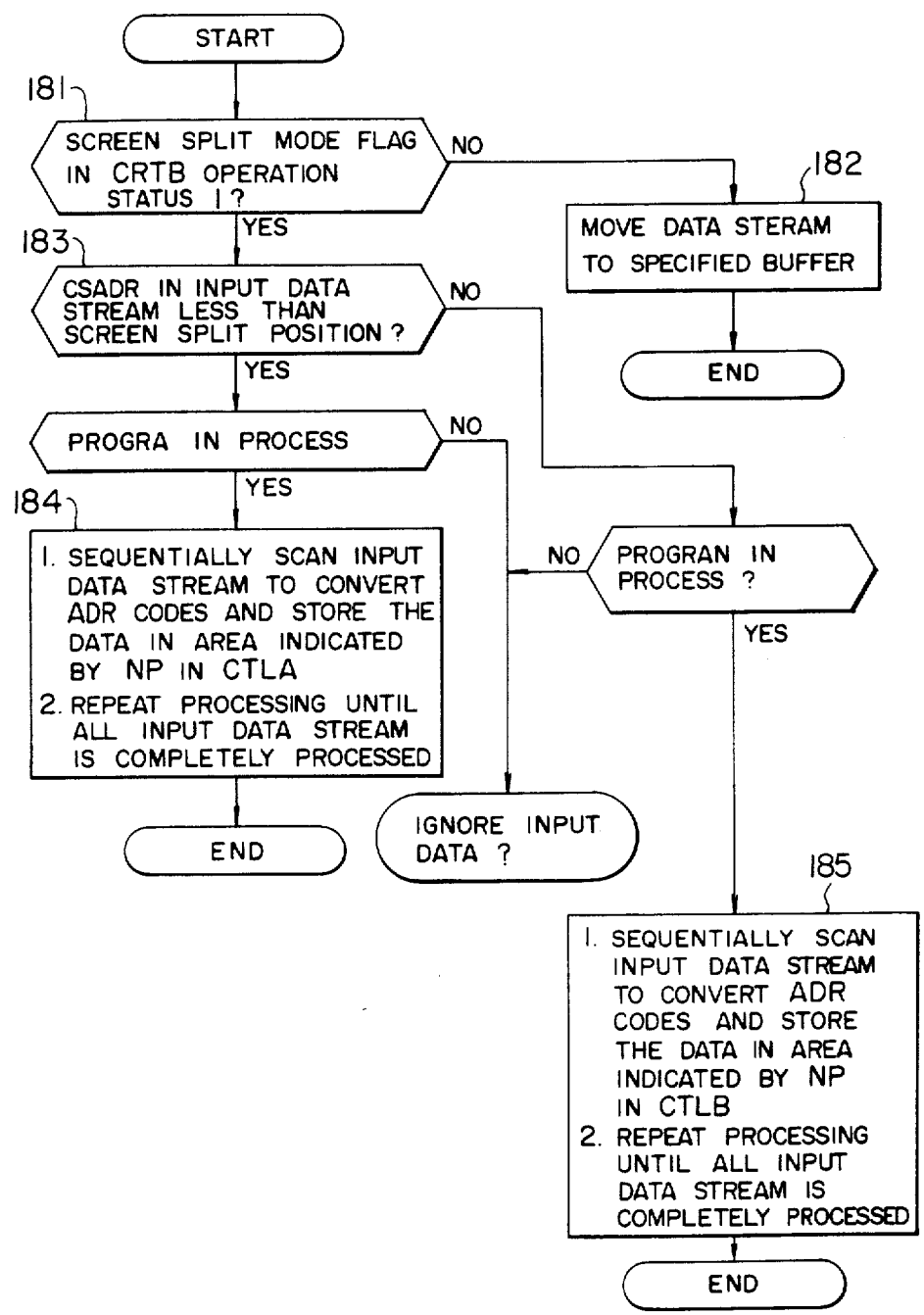
FIG. 11 is the processing flowchart of a program for processing an input data stream from a terminal according to the present invention.

FIG. 11 is the processing flowchart of the processing to be carried out by the communication control program 80 to receive data. If the result of the decision processing 181 indicate that the operation mode is not the screen split operation mode, the processing 182 is selected to perform the ordinary processing.

Next, whether the data is input from the upper-half or lower-half of the video screen is determined by the decision processing 183. Then, the processing 184 or 185 is executed depending on the result of the decision processing 183. The difference between the processing 184 and the processing 185 is whether the CTLA 41 or CTLB 42 is used.

In the processing 184 and 185, the value of the split-screen address in the input data stream is converted to the screen address for displaying the data from each application program on the screen in the single screen mode. This processing is called an inverse mapping conversion processing.

Figure 12:
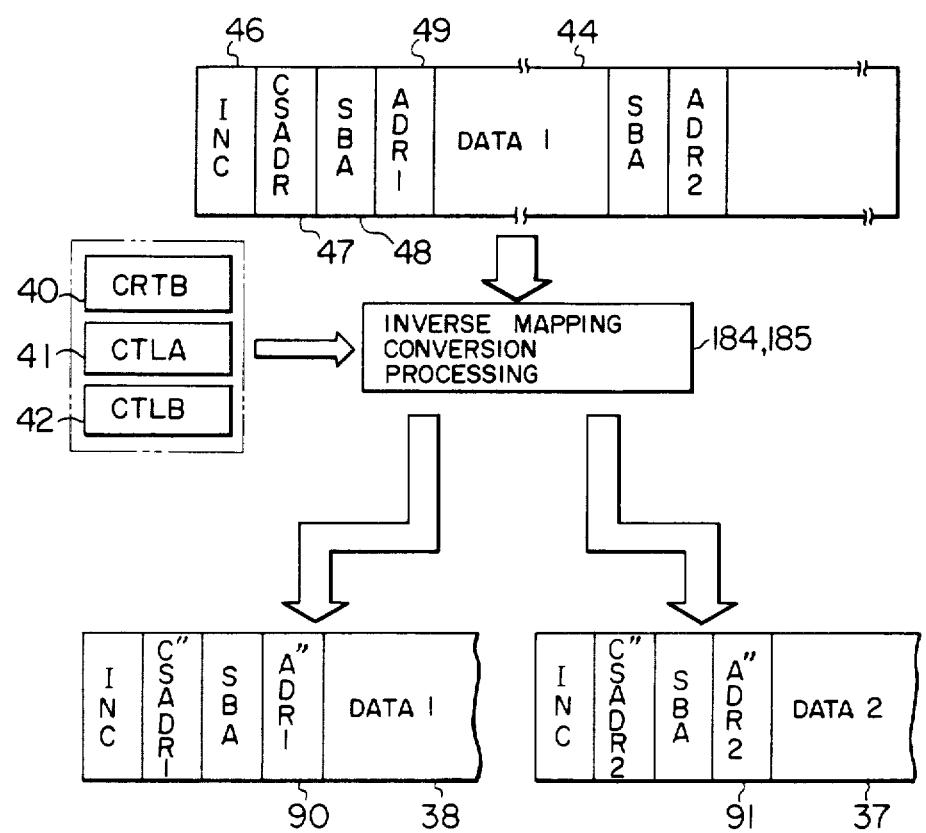
FIG. 12 shows a schematic diagram illustrating the processing for scanning an input data stream, for converting control codes, and for storing the data in the data buffer for application programs according to the present invention.

FIG. 12 is a schematic diagram illustrating the concept of the processing for converting the screen address information shown in the processing 184 and 185 of FIG. 11.

Next, the processing for storing an input data stream in the VBUF 38 by use of the control table CTLA 41 will be explained. The processing for storing an input data stream in the LBUF 37 can also be performed according to the same idea. Referring to FIG. 4, since the video screen image is split and input thereafter, the input data stream obtained by an input operation from the video data terminal 16 cannot entirely fill up the buffer VBUF 38 whose size is equal to that of the screen of the video data terminal 16. On the other hand, the application program LAAP 1 has been designed so that the input data stream length corresponds to the size of the buffer VBUF 38, that is, the size of the screen of the video data terminal 16. Consequently, the processing of a READ macro request from an application program is completed by storing the input data stream from the video data terminal 16 in the VBUF 38 at least two times. That is, the value of the $ADR_1'$ 49 can be used for the $ADR_1''$ for the first input data stream from the video data terminal 16. This is because the first input data from the video data terminal 16 is assumed to be input from the upper-half of the video screen.

When the first input data stream from the video data terminal 16 stored in the INBUF 44 is comletely moved to the VBUF 38, the last buffer address ($BE_B{}^U$) for storing data is stored in the mapping information area of the CTLA 41.

Then, the second input data stream from the video data terminal 16 stored in the INBUF 44 is sequentially scanned. When the SBA code is detected, the data following the SBA code is assumed to be the buffer address value and the value of $ADR_1 + BE_B{}^U$ is stored as the $ADR_1''$. That is, the address conversion is performed for the second input data stream from the upper-half of the screen of the video terminal 16 as if the data were input from the lower-half of the screen of the video data terminal 16. This inverse mapping conversion processing is carried out until the value of $BE_B{}^U$ becomes equal to the size of the VBUF 38.

In the processing 185 to be executed for an input data stream from the lower-half of the screen of the video data terminal 16, the address conversion is carried out for the buffer address value following the SBA code in the first input data stream to set the value of $$ADR_2 - BA_L{}^L$$

to be ADR$_2''$ 91. For the buffer address values in the second and subsequent input data streams, the value of $$ADR_2 = BA_L{}^L + BE_B{}^L$$

is set to be the ADR$_2''$ 91. The BE$_B{}^L$ is the last buffer address for storing data set in the mapping information area of the CTLB 42.

According to the embodiment of the present invention as explained above, the video screen of a video data terminal is split and an operation mode for allowing a plurality of programs to use the video screen is provided. By controlling this operation, simultaneous execution of a plurality of programs can be implemented without causing any modifications on these programs. Moreover, in application field such as the laboratory automation system, the control and data gathering operations of measuring instruments by use of local machines and data analyses by means of host machines can be simultaneously conducted from a terminal, thereby performing the concurrent processing.

In this case, furthermore, the application programs which use the terminal need not perceive that the video screen of the video data terminal is split, that is, the existing functions are not adversely influenced at all.

We claim:

1. A terminal controller in combination with at least one video terminal for allowing concurrent operations of a plurality of application programs, each said application program using an input/output data stream including an address information which enables to display data on the overall screen of a video terminal, comprising:
a plurality of input/output buffer means provided for said a plurality of application programs, respectively, to effect data input/output operation of said a plurality of application programs;
means for setting a screen split operation mode in response to a special control input information input from a video terminal connected to said terminal controller; and
conversion means for converting at least a part of a screen address information in an input/output data to be transferred between said a plurality of application programs and the video terminal when said screen split operation mode is set by said mode setting means, including first address conversion means for converting at least a portion of the screen address information in the input data stream input from said video terminal, so as to form input data streams each having an address information for the associated application program, and for transferring said input data streams to said respective buffer means provided for said a plurality of application programs, and second address conversion means for fetching a portion of an output data stream stored in each of said buffer means provided for said a plurality of application programs, and converting at least a portion of the address information included in said portion of a data stream, so as to compose an output data stream to be displayed on the overall screen of said video terminal;
whereby data output from said a plurality of application programs can be displayed in the split screen of the single video terminal.

2. A terminal controller according to claim 1 further comprising buffer means for the video terminal, for storing the input/output data streams between said conversion means and said video terminal.

3. A terminal controller according to claim 1 wherein said buffer means for the video terminal includes:
input buffer means for storing the input data stream which is input from said video terminal and for which address conversion is to be performed by said first address conversion means, and
output buffer means for storing the output data stream for which address conversion has been performed by said second address conversion means.

4. A terminal controller according to claim 2 wherein said buffer means for the video terminal includes:
input buffer means for storing the input data stream which is input from said video terminal and for which address conversion is to be performed by said first address conversion means, and
output buffer means for storing the output data stream for which address conversion has been performed by said second address conversion means.

5. A terminal means according to claim 2 wherein said second address conversion means performs said address conversion in response to a data transmission request from said application programs.

6. A terminal controller according to claim 1 further comprising memory means for storing an address information input from said video terminal on the split boundary on the screen of said video terminal; wherein said first conversion means includes first comparing means for comparing said screen address information in said input data stream input from said video terminal with the address information on the screen split boundary stored in said memory means, and means for selectively performing arithmetic processing on said screen address information in said input data stream according to the comparison result obtained by said first comparing means; and
wherein said second conversion means includes second comparing means for comparing said screen address information in said fetched output data streams output from said application programs with said address information on the screen split boundary and means for selectively performing arithmetic processing on said screen address information is said fetched output data streams according to the comparison result obtained by said second comparing means.

7. A terminal controller according to claim 1 wherein one of said a plurality of application programs is a communication program for communicating with a host machine linked with said terminal controller.

8. A terminal controller in combination with at least one video terminal for allowing concurrent operations of a plurality of application programs, each said application program using an input/output data stream including an address information which enables to display data on the overall screen of a video terminal; comprising:
first input/output buffer means for application program to perform a data input/output operation with a first application program;
second input/output buffer means for application program to perform a data input/output operation with a second application program;
input buffer means for a video terminal for storing an input data stream input from the video terminal linked with said terminal controller;
output buffer means for the video terminal for storing an output data stream to be output to said video terminal;

means for setting a screen split operation mode in response to a special control input information input from said video terminal;

means for storing an information input from said video terminal on a screen split boundary of said video terminal;

first address conversion means for converting at least a portion of an address information in an input data stream stored in said input buffer means for the video terminal according to said stored boundary information and for distributing said converted data to said first and second input/output buffer means, when said screen split operation mode is set by said mode setting means; and second address conversion means for fetching a portion of each said data stream stored in said first and second input/output buffer means, for converting at least a portion of said address information according to said stored boundary information, for composing an output data stream corresponding to the overall screen of said video terminal and for transferring said composed output data stream to said output buffer means for the video terminal when said screen split operation mode is set by said mode setting means.

* * * * *